US011489317B2

(12) United States Patent
Harr et al.

(10) Patent No.: US 11,489,317 B2
(45) Date of Patent: Nov. 1, 2022

(54) ELECTRICAL/ELECTRONICS DISTRIBUTION EQUIPMENT CABINET WITH MULTIPLE ISOLATED CABLE/CONDUIT ROUTING COMPARTMENTS

(71) Applicant: Vertiv Corporation, Columbus, OH (US)

(72) Inventors: Christopher Lee Harr, Cumming, GA (US); Carl Caldwell, Cardington, OH (US); Michael Thomas Oller, Delaware, OH (US)

(73) Assignee: Vertiv Corporation, Columbus, OH (US)

( * ) Notice: Subject to any disclaimer, the term of this patent is extended or adjusted under 35 U.S.C. 154(b) by 6 days.

(21) Appl. No.: 17/162,385

(22) Filed: Jan. 29, 2021

(65) Prior Publication Data
US 2021/0242667 A1 Aug. 5, 2021

Related U.S. Application Data

(60) Provisional application No. 62/969,259, filed on Feb. 3, 2020.

(51) Int. Cl.
*H02B 1/30* (2006.01)
(52) U.S. Cl.
CPC .................................. *H02B 1/305* (2013.01)
(58) Field of Classification Search
CPC . H02B 1/06; H02B 1/14; H02B 1/202; H02B 1/30; H02B 1/305; H02B 1/32
See application file for complete search history.

(56) References Cited

U.S. PATENT DOCUMENTS 5,280,132 A * 1/1994 Clarey .................. H02B 1/305
220/4.03
5,326,934 A 7/1994 LeMaster et al.
(Continued)

FOREIGN PATENT DOCUMENTS

| DE | 3300066 A1 * | 7/1984 | ............... H02B 1/30 |
| DE | 3612511 A1 * | 1/1987 | ............... H02B 1/30 |
| JP | 2019187032 A | 10/2019 | |

OTHER PUBLICATIONS

International Search Report and Written Opinion regarding International Application No. PCT/US2021/016055, dated May 11, 2021.

*Primary Examiner* — Robert J Hoffberg
(74) *Attorney, Agent, or Firm* — Harness, Dickey & Pierce, P.L.C.

(57) ABSTRACT

An electrical/electronics power distribution cabinet is disclosed which includes internal components enabling the cabinet to be quickly and easily reconfigured for allowing all cabling to exit an upper end of the cabinet or a lower end of the cabinet. The cabinet includes fully isolated top and bottom panelboard circuit breaker areas and a movable internal wall portion that helps to form an isolated compartment to route electrical cabling within the interior area of the cabinet, while keeping the cabling associated with the two panelboard circuit breaker areas fully separate from one another. This enables access to one of the top or bottom panelboard circuit breaker areas for service or reconfiguration without the need to access the other.

20 Claims, 4 Drawing Sheets

(56) References Cited

U.S. PATENT DOCUMENTS

| | | | |
|---|---|---|---|
| 6,565,166 B1 * | 5/2003 | Bulk | A47B 47/04 312/257.1 |
| 2008/0055822 A1 * | 3/2008 | Rearick | H05K 7/186 361/641 |
| 2010/0090789 A1 | 4/2010 | Schluter et al. | |
| 2021/0235598 A1 * | 7/2021 | Caldwell | H05K 7/20572 |

* cited by examiner

ELECTRICAL/ELECTRONICS DISTRIBUTION EQUIPMENT CABINET WITH MULTIPLE ISOLATED CABLE/CONDUIT ROUTING COMPARTMENTS

CROSS-REFERENCE TO RELATED APPLICATIONS

This application claims the benefit of U.S. Provisional Application No. 62/969,259, filed on Feb. 3, 2020. The entire disclosure of the above application is incorporated herein by reference.

FIELD

The present disclosure relates to electrical/electronics equipment cabinets, and more particularly to an electrical/electronics distribution cabinet having multiple isolated, yet reconfigurable, compartments for routing equipment cables and conduits which removes constraints on routing power handling electrical cabling through various internal areas of the cabinet while still maintaining isolation between the compartments.

BACKGROUND

The statements in this section merely provide background information related to the present disclosure and may not constitute prior art.

Present day electrical/electronics cabinets are often required to accommodate the routing of large pluralities of electrical cables into various internal areas or compartments of the cabinet, where different electrical and/or electronic components are located. In some applications it is highly desirable to separate electrical cabling such that different ones, or groups, of electrical cables are isolated within separate compartments within the cabinet apart from other cables. Since different compartments within the cabinet may need to be reconfigured to accommodate different components and/or additional electrical cables, allowing flexibility in the routing of electrical cabling into and out from the cabinet, as well as within the cabinet, is of paramount importance.

One specific example of where it is desirable to separate groups of electrical cables is in power distribution equipment cabinets. Power distribution equipment cabinets are typically used to receive output power from a power transformer cabinet and to distribute the received power via a plurality of output distribution power cables to a plurality of different power output panelboards. The power output panelboards may each include one or more circuit breakers that break a given circuit in the event of excessive current draw from one or more components operating on the given circuit.

With previously designed power distribution cabinets, typically the entire internal area is completely open. Accordingly, if there were two separate circuit breaker panelboards installed in the cabinet and only one required service, all of the power to the cabinet would have to be interrupted before service could be performed on the panelboard of interest. In many instances this would necessitate powering down a number of components being powered from the panelboard that is not being serviced. Further, previously designed power distribution cabinets may typically route electrical cabling and/or conduit through individual, fixed-location holes in one or more interior wall panels of the cabinet. This significantly restricts flexibility in the routing of electrical cables out from the panelboards, and it becomes time consuming and labor intensive to reroute the electrical cabling within the cabinet if the internal compartments of the cabinet need to be reconfigured. Having a single open area within the distribution cabinet with no means to channel cabling cleanly and efficiently, and no means to isolate internal portions of the cabinet from one another, can add to the time required to maintain, service or reconfigure specific components within the distribution cabinet.

Accordingly, a need exists for an electrical/electronics equipment cabinet design which provides for significantly improved flexibility in routing electrical cabling and conduit within an electrical/electronics equipment cabinet, and which provides improved cabling/conduit routing flexibility, while still providing multiple independent, isolated compartments within the cabinet that can be accessed separately. There is further a need for an electrical/electronics equipment cabinet which is readily adapted to use with a wide range of electrical and electronic components, where it is desirable to isolate the components and associated cabling within separate compartments or areas of the cabinet, and to provide for flexibility in routing of cabling within the cabinet, and where the cabinet is not limited to only power distribution applications.

SUMMARY

This section provides a general summary of the disclosure, and is not a comprehensive disclosure of its full scope or all of its features.

In one aspect the present disclosure relates to an equipment cabinet. The equipment cabinet may comprise first and second outer vertical wall panels spaced apart from one another. A top wall may be included which spans between upper ends of the first and second outer vertical walls, with the top wall including first and second spaced apart openings. At least one removable top wall panel may be included which is removably secured to the top wall in one of the spaced apart openings in the top wall. A bottom wall may be included which spans between lower ends of the first and second outer vertical walls, with the bottom wall including first and second spaced apart openings. At least one removable bottom wall panel may be included which his removably secured to the bottom wall in one of the spaced apart openings in the bottom wall. An internal plate may be included which extends laterally from at least one of the first and second outer vertical wall panels, and which creates a horizontal partition to help form a top panelboard circuit breaker area and a bottom panelboard circuit breaker area. At least one of the removable top wall panel or the removable bottom wall panel is configured to enable a plurality of independent electrical cables to be routed therethrough to an interior area of the equipment cabinet, and further such that at least a first one of the plurality of independent electrical cables is routed into the top panelboard circuit breaker area, and at least a second one of the plurality of independent electrical cables is routed into the bottom panelboard circuit breaker area. An internal wall structure may be included which includes a movable internal panel. The internal wall structure may be disposed adjacent one of the first or second outer vertical walls of a dimension to help form an independent compartment within a selected one of the top or bottom panelboard circuit breaker areas, depending on a placement of the movable internal panel. This allows the internal wall structure to isolate the first and second ones of the plurality of electrical cables from one another within the selected one of the top or bottom panelboard circuit breaker areas, while permitting one of the first or second ones of the plurality of electrical cables to extend into the other one of the top or bottom panelboard circuit breaker areas.

In another aspect the present disclosure relates to an equipment cabinet. The equipment cabinet may comprise first and second outer vertical wall panels spaced apart from one another. A top wall may be included which spans between upper ends of the first and second outer vertical walls, the top wall including first and second spaced apart openings. A pair of removable top wall panels may be included which are removably secured to the top wall in the first and second spaced apart openings in the top wall. A bottom wall may be included which spans between lower ends of the first and second outer vertical walls, the bottom wall including first and second spaced apart openings. A pair of removable bottom wall panels may be included which are removably secured to the bottom wall in the first and second spaced apart openings in the bottom wall. An internal plate may be included which extends laterally from at least one of the first and second outer vertical wall panels, and which creates a horizontal partition to help form a top panelboard circuit breaker area and a bottom panelboard circuit breaker area. At least one of both of the removable top wall panels, or both of the removable bottom wall panels, may be configured to enable a plurality of independent electrical cables to be routed therethrough to an interior area of the equipment cabinet, and further such that at least a first one of the plurality of independent electrical cables is routed into the top panelboard circuit breaker area, and at least a second one of the plurality of independent electrical cables is routed into the bottom panelboard circuit breaker area. Both of the removable top wall panels may be interchangeably positionable with both of the removable bottom wall panels, such that the equipment cabinet is able to be configured to enable the plurality of independent electrical cables to enter the cabinet through either the top wall or the bottom wall. An internal wall structure may be included which incorporates a movable internal panel. The internal wall structure may be disposed adjacent to, but spaced apart from, one of the first or second outer vertical walls, and may be of a dimension to help form an independent compartment within a selected one of the top or bottom panelboard circuit breaker areas. In this manner the internal wall structure may isolate the first and second ones of the plurality of electrical cables from one another within the selected one of the top or bottom panelboard circuit breaker areas, while still permitting one of the first or second ones of the plurality of electrical cables to extend into the other one of the top or bottom panelboard circuit breaker areas.

In still another aspect the present disclosure relates to a method for forming an equipment cabinet. The method may comprise placing first and second outer vertical wall panels in a spaced apart orientation from one another. The method may further include arranging a top wall to span between upper ends of the first and second outer vertical walls, with the top wall including first and second spaced apart openings. The method may further include securing first and second removable top wall panels to the top wall in first and second openings in the top wall, and also arranging a bottom wall to span between lower ends of the first and second outer vertical walls, with the bottom wall including first and second spaced apart openings. The method may further include securing first and second removable bottom wall panels in first and second openings in the bottom wall. The method may further include using an internal plate arranged to extend laterally from at least one of the first and second outer vertical wall panels, to create a laterally extending partition to help form a top panelboard circuit breaker area and a bottom panelboard circuit breaker area. The method may also include further configuring the removable top wall panels or the removable bottom wall panels to enable a plurality of independent electrical cables to be routed therethrough to an interior area of the equipment cabinet, and further such that at least a first one of the plurality of independent electrical cables is routed into the top panelboard circuit breaker area, and at least a second one of the plurality of independent electrical cables is routed into the bottom panelboard circuit breaker area. The method may further include disposing an internal wall structure, having a movable internal panel, such that the internal wall structure is disposed adjacent one of the first or second outer vertical walls, and is of a dimension to help form an independent compartment within a selected one of the top or bottom panelboard circuit breaker areas. This enables the internal wall structure, depending on a placement of the movable internal panel, to isolate the first and second ones of the plurality of electrical cables from one another within the selected one of the top or bottom panelboard circuit breaker areas, while still permitting one of the first or second ones of the plurality of electrical cables to extend into the other one of the top or bottom panelboard circuit breaker areas.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings in which.

DETAILED DESCRIPTION

Example embodiments will now be described more fully with reference to the accompanying drawings.

Figure 1:
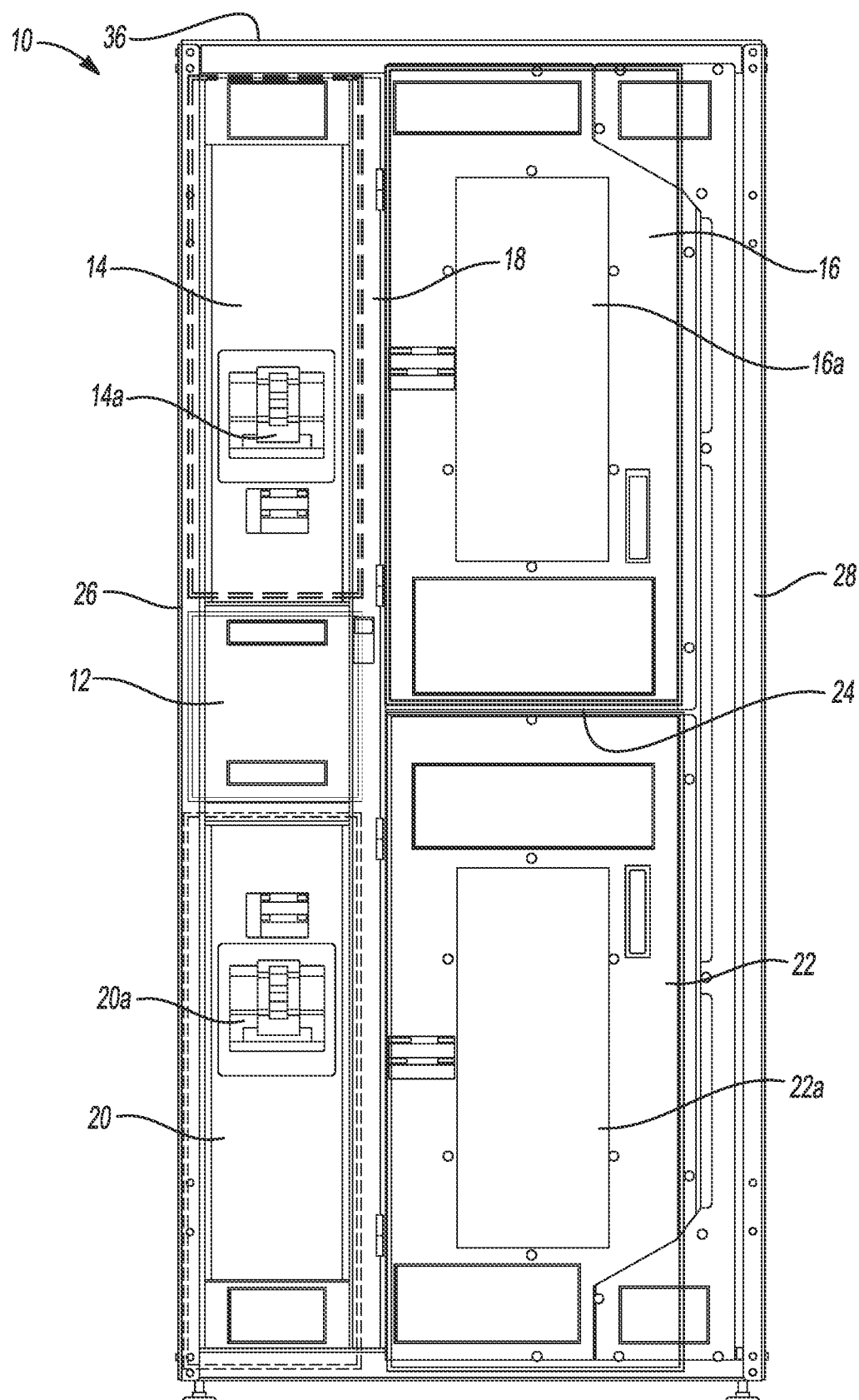
FIG. 1 is a simplified front diagrammatic view of one embodiment of an electrical/electronics distribution equipment cabinet in accordance with the present disclosure with the front exterior door of the cabinet removed, which shows one example of five isolated compartments formed within the cabinet.

Referring to FIG. 1, an electrical/electronics equipment cabinet 10 (hereinafter simply "cabinet 10") is shown in one embodiment of the present disclosure. The cabinet 10 is shown without the front exterior doors that would typically enable access to separate areas of the cabinet. Area 12 forms a control area for a user control and/or printed wiring assembly and associated electronics. Area 14 forms a top (i.e., first) panelboard main breaker area (hereinafter simply "top panelboard main breaker area 14") which receives power from a separate (not shown) input cabinet (which may have a transformer or which may be transformerless). The top panelboard main breaker area 14 houses a top (i.e., first) main circuit breaker 14a (hereinafter simply "top main circuit breaker 14a"). Area 16 forms a top (i.e., first) panelboard circuit breaker area (hereinafter simply "top panelboard circuit breaker area 16") which contains a top (i.e., first) circuit breaker panel (indicated in simplified form by rectangle 16a, and hereafter simply "top circuit breaker panel 16a) that receives the output from the top main circuit breaker 14a. An internal vertical wall 18 helps to form one wall portion for the top panelboard circuit breaker area 16. The top circuit breaker panel 16a includes a plurality of independent circuit breakers that help to create independent circuits to which separate electrical cables can be attached and used to feed downstream electrical components with electrical power.

With further reference to FIG. 1, area 20 forms a bottom (i.e., second) panelboard main breaker area (hereinafter simply "bottom panelboard main breaker area 20") having a bottom (i.e., second) main circuit breaker 20a (hereinafter simply "bottom main circuit breaker 20a"). The bottom main circuit breaker 20a also receives the output from the input cabinet (not shown) at its input and is coupled at its output to a bottom (i.e., second) circuit breaker panel 22a (hereinafter simply "bottom circuit breaker panel 22a") residing within a bottom (i.e., second) panelboard circuit breaker area 22 (hereinafter simply "bottom panelboard circuit breaker area 22"). The internal vertical wall 18 also helps to form one wall portion for the bottom panelboard circuit breaker area 22. The bottom circuit breaker panel 22a includes a plurality of independent circuit breakers to which separate electrical cables can be attached and used to help form separate circuits for feeding an additional plurality of electrical components with electrical power. An internal conduit plate 24 forms a horizontal partition to help separate the two panelboard circuit breaker areas 16 and 22.

Figure 2:
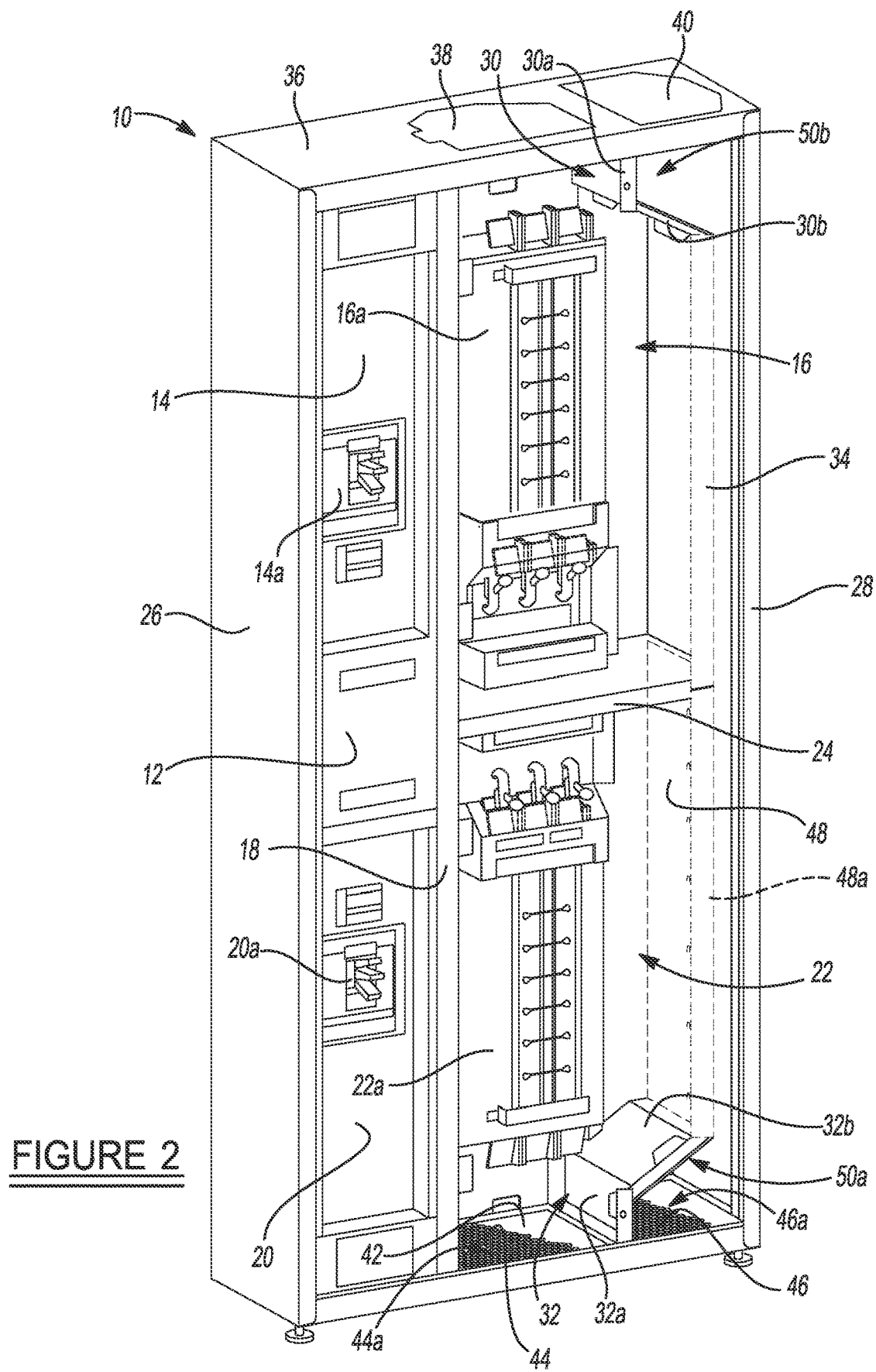
FIG. 2 is a front perspective view of the cabinet of FIG. 1 illustrating in highlighted lines a movable internal panel that may be secured in either of two locations adjacent the top and bottom panelboard circuit breaker areas of the cabinet, depending on whether top or bottom areas of the cabinet are used to route electrical cabling out from the cabinet, and wherein the movable internal panel is positioned to enable routing cabling out of the bottom area of the cabinet.
Figure 3:
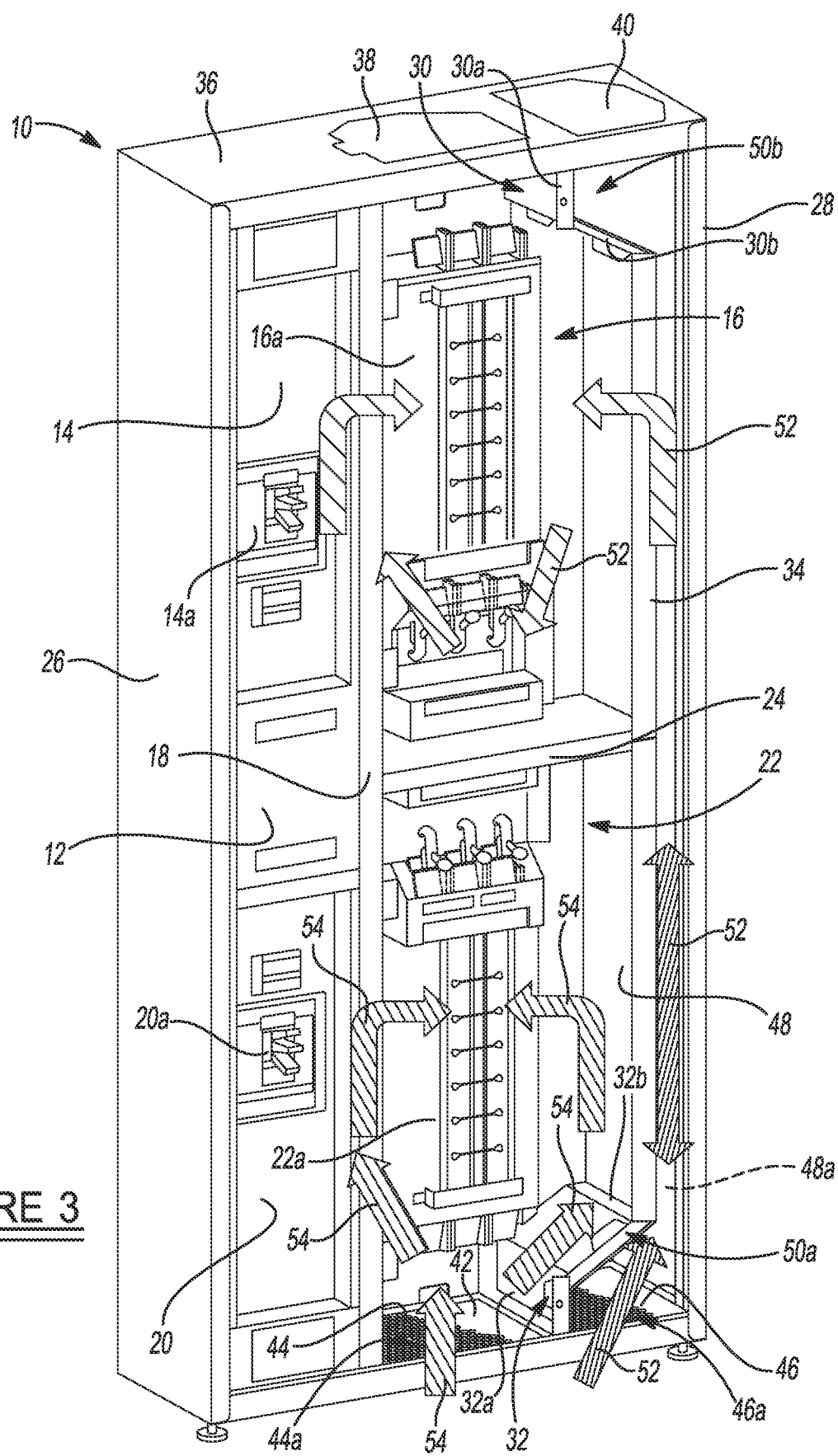
FIG. 3 is a front perspective view of the cabinet of FIG. 2 showing the movable internal panel disposed in the bottom panelboard circuit breaker area, thus helping to configure the cabinet for routing electrical cabling out from the bottom of the cabinet.

Referring further to FIGS. 2 and 3, the cabinet 10 can also be seen to include first and second outer vertical wall panels 26 and 28, an upper inner angled panel section 30 having upper panel portions 30a and 30b, and a lower inner angled panel section 32 having lower panel portions 32a and 32b. A relatively narrow vertical wall element 34 is coupled at its upper end to a lower edge of the upper panel portion 30b, and at its lower end to an upper edge of the lower panel portion 32b. The narrow vertical wall element 34 is positioned inwardly of the outer vertical wall panel 28 to form a space between its rightmost vertical edge and the inside surface of the outer vertical wall panel 28. This space may vary but typically a spacing of at least 40 mm is preferred. In a preferred embodiment of the cabinet 10, this spacing is about 40 mm at the front side of the cabinet, and behind the front edge of the outer vertical wall panel 28, the space opens up to about 75 mm.

FIGS. 2 and 3 further illustrate that the upper panel portion 30a is arranged to be coupled to an inside surface of a top wall 36 such that it is vertically positioned between a first removable top wall panel 38 and a second removable top wall panel 40. Thus, upper inner angled panel section 30 helps to form a partition between the openings covered by the first and second removable top wall panels 38 and 40, respectively. Similarly, the lower panel portion 32a is coupled at one end to an inside surface of a bottom wall 42. The bottom wall 42 includes a first removable bottom wall panel 44, and a second removable bottom wall panel 46 on the other side of the panel portion 32a. Thus, the lower inner angled panel section 32 helps to form a partition between the openings covered by the first and second removable bottom wall panels 44 and 46, respectively. The removable bottom wall panels 44 and 46 have a plurality of pre-punched holes filled with plug bushings 44a and 46a, respectively. Removing any of the plug bushings 44a or 46a creates a hole through which electrical cabling or an electrical conduit can extend out from the lower area of the cabinet 10. The pluralities of holes created by selectively removing ones of the plug bushings 44a and/or 46a enable different quantities of electrical cabling and/or conduits to be fed out from the bottom panelboard circuit breaker area 22 through the bottom wall 42.

It is an advantage of the cabinet 10 construction that the removable top wall panels 38 and 40 can be swapped in position with the removable bottom wall panels 44 and 46, respectively. This enables the cabinet 10 to be quickly and easily reconfigured to enable top exiting cables or bottom exiting cables. Still further, the cabinet 10 may be configured such that only the top wall panel 38 is swapped with the bottom wall panel 44, while the panels 40 and 46 are left in the locations shown in FIG. 2. Or still further, the panels 38 and 44 may be left in the positions shown in FIG. 2 while the panels 40 and 46 are swapped. These latter two configurations enable cables to exit from both the top and bottom areas of the cabinet 10.

With further reference to FIGS. 2 and 3, the cabinet 10 includes a movable (i.e., reconfigurable) internal panel 48 that can be secured to a portion of the vertical wall element 34 in either of two spaced apart vertical locations to help configure the internal area of the cabinet 10 for cable routing through the upper end or lower end of the cabinet. The movable internal panel 48 is shown simply in outlining in FIG. 2. Once attached in either location, the movable internal panel 48 closes off the adjacent top or bottom panelboard circuit breaker area (i.e., either area 16 or area 22) and forms a channel through which electrical cabling can be routed. In effect, the movable internal panel 48 helps to create a solid internal wall either between internal conduit plate 24 and lower panel portion 32b, or between upper panel portion 30b and the internal conduit plate 24. The vertical wall element 34 also helps to create a "window" or opening to route cables through the cabinet 10 interior between the internal conduit plate 24 and lower panel portion 32b, or between upper panel portion 30b and the internal conduit plate 24. Thus, when attached adjacent the bottom panelboard circuit breaker area 22, the movable internal panel 48 helps to form a vertical compartment 48a in communication with a lower compartment 50a for channeling and separating electrical cabling which is coupled at one end to the top circuit breaker panel 16a, and which exits through one or more of the plurality of holes formed by removing plug bushings 46a in the bottom wall panel 46 of the cabinet 10. In this manner the electrical cabling coupled to the top circuit breaker panel 16a is fully isolated from the bottom panelboard circuit breaker area 22. A separate quantity of electrical cabling can be coupled to the individual circuit breakers of the bottom circuit breaker panel 22a and routed out through one or more of the plurality of holes formed by removing plug bushings 44a in the bottom wall panel 44, fully separate and isolated from the lower compartment 50a and the vertical compartment 48a. With reference to FIG. 3, arrows 52 indicate the routing of the electrical cabling which communicates with the top panelboard circuit breaker area 16, while arrows 54 indicate the routing of the electrical cabling which communicates with the bottom panelboard circuit breaker area 22.

Figure 4:
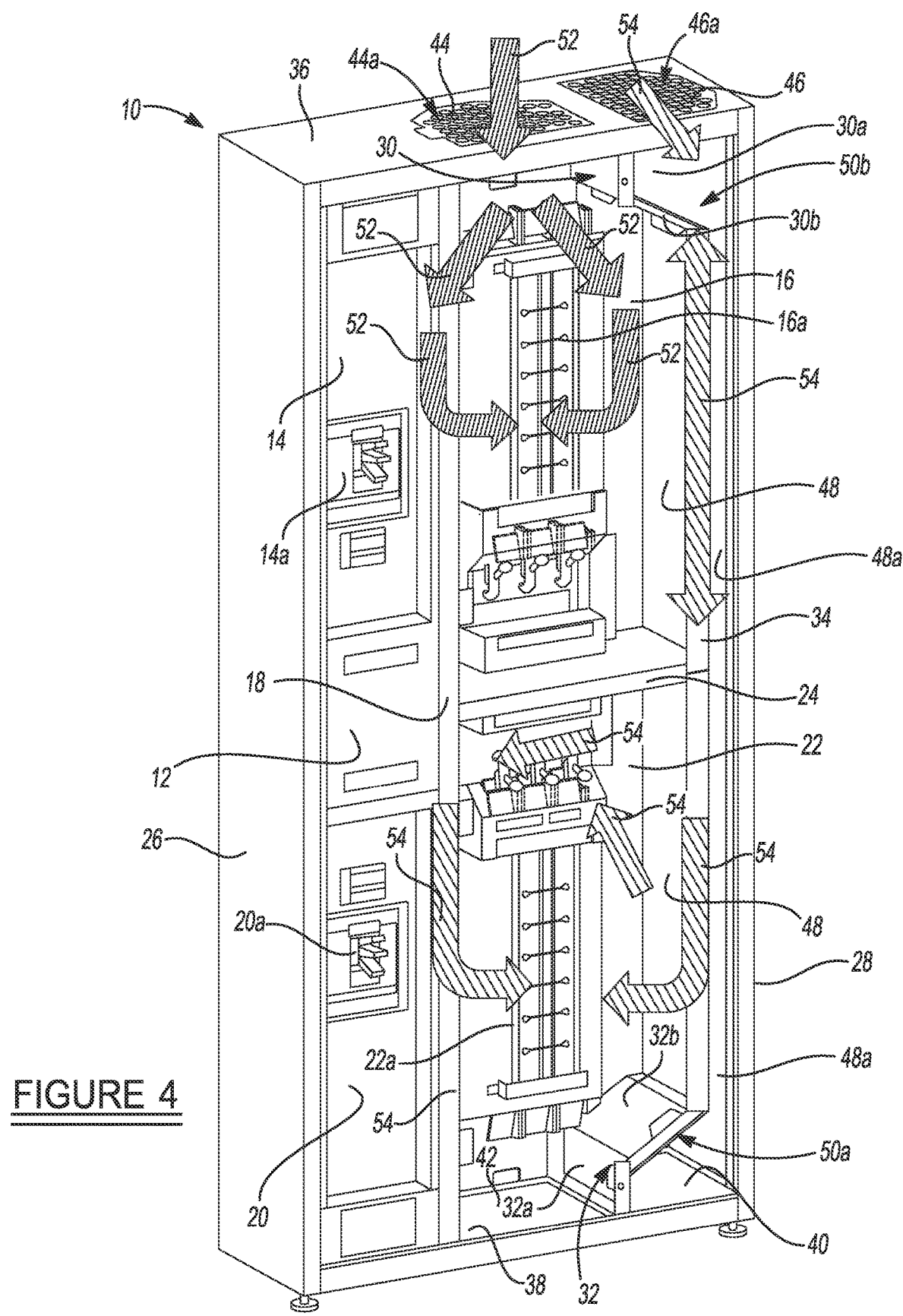
FIG. 4 is a front perspective view of the cabinet of FIG. 2 but with the movable internal panel disposed in the top panelboard circuit breaker area, thus helping to configure the cabinet to enable electrical cabling to exit out from the top of the cabinet.

FIG. 4 shows the cabinet 10 configured for feeding electrical cabling out from the upper end of the cabinet. In this configuration the removable bottom wall panels 44 and 46 are swapped in position with the removable top wall panels 38 and 40, and the movable panel 48 is secured adjacent the top panelboard circuit breaker area 16 such that the vertical compartment 48a is formed adjacent the top panelboard circuit breaker area 16. Arrows 52 indicate the routing paths of a first plurality of electrical cables that extend through an opening in the top panel 36 when the plug bushings 44a in the removable panel 44 are removed, and which connect to the top circuit breaker panel 16a in the top panelboard circuit breaker area 16. Arrows 54 indicate the routing paths of a second, separate group of electrical cables that extend through an opening in the top panel 36 when the plug bushings 46a in the removable panel 46 are removed, and which are routed down through an upper compartment 50b formed by the upper inner angled wall sections 30a and 30b, through the vertical compartment 48a, and into the bottom panelboard circuit breaker area 22 to connect to the bottom circuit breaker panel 22a. In this configuration the electrical cables which couple to the bottom circuit breaker panel 22a are kept fully separate and isolated from the top panelboard circuit breaker area 16.

In both of the configurations shown in FIGS. 3 and 4, the top and bottom panelboard circuit breaker areas 16 and 22 can be accessed separately for service or when reconfiguration of the cabinet 10 is needed. This is an important benefit, as accessing one or more of the internal compartments associated with areas 12, 14, 16, 20 and 22 can be accomplished without the need to expose other internal areas of cabinet 10 where no work or maintenance is needed. Therefore, being able to separately access the top and bottom panelboard circuit breaker areas 16 and 22 can provide a time savings when performing maintenance work or when reconfiguring one or the other of the two areas 16 and 22 of the cabinet 10.

An additional benefit that the cabinet 10 provides is that if one or the other of the circuit breaker panels 16a or 22a needs to be shut down for service or reconfiguration, it may be possible to leave the other one in a fully operational state, thus eliminating disruption to downstream devices being powered by the cabinet 10. This feature therefore minimizes the disruption to downstream components that are being powered from the circuit breaker panel 16a or 22a that does not require service or reconfiguration.

Yet another benefit that the cabinet 10 provides is that all, or just select ones, of the electrical cables exiting the cabinet can be routed out through either the top or the bottom of the cabinet, or through a combination of top and bottom exit routing. This significantly helps to organize the electrical cabling within the cabinet 10 and to maintain a neat and orderly work environment around the cabinet 10.

Still another benefit of the cabinet 10 is the ease with which the cabinet can be reconfigured to allow for upper or lower exiting of all the electrical cabling. The movable internal panel 48 can be moved between its upper position (FIG. 4) and its lower position (FIG. 3) without special tools or complex procedures, as can the panels 38, 40, 44 and 46.

The reconfiguring of the movable panel 48, as well as the panels 38, 40, 44 and 46, can be accomplished in just minutes, making an initial configuration, or reconfiguration, of the cabinet 10 a quick process which is easily accomplished by a single individual.

While the figures have illustrated one specific example of the electrical/electronics equipment cabinet in the form of a power distribution cabinet, it will be appreciated that the cabinet of the present disclosure is expected to find utility in other applications besides power distribution applications. Other various embodiments of the cabinet 10 may be configured with little or no modification to provide isolated internal compartments for a wide range of different types of electrical and/or electronic components, with the important benefit that electrical cabling associated with different components is routed within the cabinet in a manner so as to be isolated within internal areas of the cabinet, and without the need for complicating the routing of cabling into and/or out from the cabinet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An equipment cabinet comprising:
   first and second outer vertical wall panels (26 and 28) spaced apart from one another;
   a top wall (36) spanning between upper ends of the first and second outer vertical wall panels, THE top wall including first and second spaced apart top openings;
   two removable top wall panels (38 and 40), each of the two removable top wall panels removably secured to the top wall (36) in a corresponding one of the first and second spaced apart top openings in the top wall;
   a bottom wall (42) spanning between lower ends of the first and second outer vertical panels, the bottom wall including first and second spaced apart bottom openings;
   two removable bottom wall panels (44 and 46), each of the two removable bottom wall panels removably secured to the bottom wall (36) in a corresponding one of the first and second spaced apart bottom openings in the bottom wall;
   an internal plate (24) extending laterally from at least one of the first or second outer vertical wall panels, and creating a horizontal partition to help form a top panelboard circuit breaker area (16) and a bottom panelboard circuit breaker area (22);
   at least one of the two removable top wall panels (38 and 40) or the two removable bottom wall panels (44 and 46) configured to enable a plurality of independent electrical cables to be routed therethrough to an interior area of the equipment cabinet, and further such that at least a first one of the plurality of independent electrical cables is routed into the top panelboard circuit breaker area, and at least a second one of the plurality of independent electrical cables is routed into the bottom panelboard circuit breaker area; and
   an internal wall structure (34,48,32,30) including a movable internal panel (48), the internal wall structure being disposed adjacent to one of the first outer vertical wall panel and the second outer vertical wall panel to help form an independent compartment adjacent to a selected one of the top and bottom panelboard circuit breaker areas, the selected one of the top and bottom panelboard circuit breaker areas depending on a placement of the movable internal panel, the independent compartment isolates the at least the first one of the plurality of independent electrical cables and the at least the second one of the plurality of independent electrical cables from one another within the selected one of the top and bottom panelboard circuit breaker areas, while permitting one of:
      when the selected one of the top and bottom panelboard circuit breaker areas is the top panelboard circuit breaker area having the movable internal panel placed adjacent to the top panelboard circuit breaker area, the at least the first one of the plurality of independent electrical cables is routed directly into the top panelboard circuit breaker area and the at least the second one of the plurality of independent electrical cables extends through the independent compartment into the bottom panelboard circuit breaker area, and
      when the selected one of the top and bottom panelboard circuit breaker areas is the bottom panelboard circuit breaker area having the movable internal panel placed adjacent to the bottom panelboard circuit breaker area, the at least the first one of the plurality of independent electrical cables extends through the independent compartment into the bottom panelboard circuit breaker area and the at least the second one of the plurality of independent electrical cables is routed directly into the bottom panelboard circuit breaker area.

2. The equipment cabinet of claim 1, wherein the two removable top wall panels include independently removable first and second top wall panels (38/40).

3. The equipment cabinet of claim 2, wherein the two removable bottom wall panels include independently removable first and second bottom wall panels (44/46).

4. The equipment cabinet of claim 1,
   the removable bottom wall panels include independently removable first and second bottom wall panels.

5. The equipment cabinet of claim 4, wherein either:
   each of the independently removable first and second top wall panels is configured to include a removable plug bushing (44a or 46a) to define a top hole through which a corresponding one of the plurality of independent electrical cables is configured to be routed; or
   each of the independently removable first and second bottom wall panels is configured to include a removable plug bushing (44a or 46a) to define a bottom hole through which a corresponding one of the plurality of independent electrical cables is configured be routed.

6. The equipment cabinet of claim 4, wherein the first and second independently removable top wall panels are interchangeable with the first and second independently removable bottom wall panels, respectively, such that each of the first and second removable top wall panels is configured to be mounted in either of the top wall or the bottom wall, and each of the removable bottom wall panels is configured to be mounted in either of the top wall or the bottom wall.

7. The equipment cabinet of claim 6, wherein the equipment cabinet is configured to enable entry of the plurality of independent electrical cables from either of the top wall or the bottom wall, depending on the placement of the independently removable first and second top wall panels and the independently removable first and second bottom wall panels.

8. The equipment cabinet of claim 4, wherein the internal wall structure further includes:
an upper inner angled panel section secured to an inner surface of the top wall for helping to form a partition between the first and second spaced apart top openings in the top wall;
a lower inner angled panel section secured to an inner surface of the bottom wall for helping to form a partition between the first and second spaced apart bottom openings in the bottom wall.

9. The equipment cabinet of claim 8, wherein the upper inner angled panel section (30) includes a pair of upper panel portions (30a and 30b) angled to be non-parallel to one another and at least substantially bridging a span between an inner surface of the top wall and an inner surface of one of the first and second outer vertical wall panels.

10. The equipment cabinet of claim 9, wherein the lower inner angled panel section (32) includes a pair of lower panel portions (32a and 32b) angled to be non-parallel to one another and at least substantially bridging a span between an inner surface of the bottom wall and the inner surface of the one of the first and second outer vertical wall panels.

11. The equipment cabinet of claim 10, further comprising:
a narrow vertical wall element (34) extending substantially between the upper inner angled panel section (30) and the lower inner angled panel section (32), the narrow vertical wall element adjacent to the one of the first and second outer vertical wall panels; and
the narrow vertical wall element configured to interface with the movable internal panel to help form the independent compartment within the selected one of the top and bottom panelboard circuit breaker areas.

12. The equipment cabinet of claim 1, further comprising an internal vertical wall (18) arranged vertically within the equipment cabinet and extending between the top and bottom walls, and intersecting with the internal plate (24), for assisting in forming the top and bottom panelboard circuit breaker areas (16 and 22).

13. The equipment cabinet of claim 12, wherein the internal vertical wall (18) further is configured to assist in forming at least one additional independent compartment (12) within the equipment cabinet.

14. The equipment cabinet of claim 12, wherein the internal vertical wall (18) assists in forming at least the top and bottom panelboard main breaker areas (14 and 20) for housing main circuit breakers (14a and 20a) associated with the top panelboard circuit breaker area (16) and the bottom panelboard circuit breaker area (22), respectively.

15. The equipment cabinet of claim 13, wherein the internal vertical wall (18) assists in forming a control area (12) for housing at least one of:
a user control, or
a printed wiring assembly and associated electronics.

16. An equipment cabinet comprising:
first and second outer vertical wall panels (26 and 28) spaced apart from one another;
a top wall (36) spanning between upper ends of the first and second outer vertical wall panels, the top wall including first and second spaced apart top openings;
a pair of independently removable top wall panels (38 and 40) removably secured to the top wall in the first and second spaced apart top openings in the top wall;
a bottom wall (42) spanning between lower ends of the first and second outer vertical wall panels, the bottom wall including first and second spaced apart bottom openings;
a pair of independently removable bottom wall panels (44 and 46) removably secured to the bottom wall (42) in the first and second spaced apart bottom openings in the bottom wall;
an internal plate (24) extending laterally from at least one of the first outer vertical wall panel or the second outer vertical wall panel, and creating a horizontal partition to help form a top panelboard circuit breaker area (16) and a bottom panelboard circuit breaker area (22);
at least one of:
both of the pair of independently removable top wall panels (38 and 40), or
both of the pair of independently removable bottom wall panels (44 and 46),
configured to enable a plurality of independent electrical cables to be routed therethrough to an interior area of the equipment cabinet, and further such that at least a first one of the plurality of independent electrical cables is routed into the top panelboard circuit breaker area, and at least a second one of the plurality of independent electrical cables is routed into the bottom panelboard circuit breaker area;
both of the pair of independently removable top wall panels being interchangeably positionable with both of the pair of the independently removable bottom wall panels, such that the equipment cabinet is able to be configured to enable the plurality of independent electrical cables to enter the equipment cabinet through either the top wall or the bottom wall; and
an internal wall structure (34,48,32,30) including a movable internal panel (48), the internal wall structure being disposed adjacent to, but spaced apart from, one of the first outer vertical wall panel and the second outer vertical wall panel to help form an independent compartment adjacent to a selected one of the top and bottom panelboard circuit breaker areas, the selected one of the top and bottom panelboard circuit breaker areas depending on a placement of the movable internal panel, the independent compartment isolates the at least the first one from the at least the second one of the plurality of independent electrical cables from one another within the selected one of the top and bottom panelboard circuit breaker areas, while permitting one of:
when the selected one of the top and bottom panelboard circuit breaker areas is the top panelboard circuit breaker area having the movable internal panel placed adjacent to the top panelboard circuit breaker area, the at least the first one of the plurality of independent electrical cables is routed directly into the top panelboard circuit breaker area and the at least the second one of the plurality of independent electrical cables extends through the independent compartment into the bottom panelboard circuit breaker area, and
when the selected one of the top and bottom panelboard circuit breaker areas is the bottom panelboard circuit breaker area having the movable internet panel placed adjacent to the bottom panelboard circuit breaker area, the at least the first one of the plurality of independent electrical cables extends through the independent compartment into the bottom panelboard circuit breaker area and the at least the second one of the plurality of independent electrical cables is routed directly into the bottom panelboard circuit breaker area.

17. The equipment cabinet of claim 16, wherein either:
   each of the pair of independently removable top wall panels is configured to include a removable plug bushing (44a or 46a) to define a top hole through which a corresponding one of the plurality of independent electrical cables is configured to be routed; or
   each of the pair of independently removable bottom wall panels is configured to include a removable plug bushing (44a or 46a) to define a bottom hole through which a corresponding one of the plurality of independent electrical cables is configured to be routed;
   wherein a first one of the pair of independently removable top wall panels has a different shape than a second one of the pair of independently removable top wall panels;
   wherein a first one of the pair of independently removable bottom wall panels has a different shape than a second one fo the pair of independently removable bottom wall panel; and
   wherein the first one of the pair of independently removable top panels is shaped identical to the first one of the pair of independently removable bottom panels, and the second one of the pair of independently removable top panels is shaped identical to the second one of the pair of independently removable bottom panels.

18. The equipment cabinet of claim 16, wherein the internal wall structure further includes:
   an upper inner angled panel section (30) secured to an inner surface of the top wall for helping to form a partition between the first and second spaced apart top openings in the top wall; and
   a lower inner angled panel section (32) secured to an inner surface of the bottom wall for helping to form a partition between the first and second spaced apart bottom openings in the bottom wall.

19. The equipment cabinet of claim 18, wherein:
   the upper inner angled panel section (30) includes a pair of upper panel portions (30a and 30b) angled to be non-parallel to one another and at least substantially bridging a span between an inner surface of the top wall and an inner surface of one of the first and second outer vertical wall panels; and
   the lower inner angled panel section (32) includes a pair of lower panel portions (32a and 32b) angled to be non-parallel to one another and at least substantially bridging a span between an inner surface of the bottom wall and the inner surface of the one of the first and second outer vertical wall panels.

20. A method for forming an equipment cabinet, the method comprising:
   placing first and second outer vertical wall panels (26 and 28) in a spaced apart orientation from one another;
   arranging a top wall (36) to span between upper ends of the first and second outer vertical wall panels, the top wall including first and second spaced apart top openings;
   securing first and second removable top wall panels (38 and 40) to the top wall in first and second top openings in the top wall;
   arranging a bottom wall (42) to span between lower ends of the first and second outer vertical wall panels, the bottom wall including first and second spaced apart bottom openings;
   securing first and second removable bottom wall panels (44 and 46) in first and second bottom openings in the bottom wall (42);
   using an internal plate (24) arranged to extend laterally from at least one of the first outer vertical wall panel or the second outer vertical wall panel, to create a laterally extending partition to help form a top panelboard circuit breaker area (16) and a bottom panelboard circuit breaker area (22);
   further configuring the removable top wall panels (38 and 40) or the removable bottom wall panels (44 and 46) to enable a plurality of independent electrical cables to be routed therethrough to an interior area of the equipment cabinet, and further such that at least a first one of the plurality of independent electrical cables is routed into the top panelboard circuit breaker area, and at least a second one of the plurality of independent electrical cables is routed into the bottom panelboard circuit breaker area; and
   disposing an internal wall structure (34,48,32,30) having a movable internal panel (48), such that the internal wall structure is disposed adjacent to one of the first outer vertical wall panel and the second outer vertical wall panel to help form an independent compartment adjacent to a selected one of the top and bottom panelboard circuit breaker areas, the selected one of the top and bottom panelboard circuit breaker areas depending on a placement of the movable internal panel, the independent compartment isolates the at least the first one of the plurality of independent electrical cables and the at least second one of the plurality of independent electrical cables from one another within the selected one of the top or bottom panelboard circuit breaker areas (16 or 22), while permitting one of the first or second ones of:
      when the selected one of the top and bottom panelboard circuit breaker areas is the top panelboard circuit breaker area having the movable internal panel placed adjacent to the top panelboard circuit breaker area, the at least the first one of the pluarlity of independent electrical cables is routed directly into the top panelboard circuit breaker area and the at least the second one of the plurality of independent electrical cables extends through the independent compartment into the bottom panelboard circuit breaker area, and
      when the selected one of the top and bottom panelboard circuit breaker areas is the bottom panelboard circuit breaker area having the movable internal panel placed adjacent to the bottom panelboard circuit breaker area, the at least the first one of the plurality of independent electrical cables extends through the independent compartment into the bottom panelboard circuit breaker area and the at least the second one of the pluality of independent electrical cables to routed directly into the bottom panelboard circuit breaker area.

* * * * *